(12) United States Patent
Chen et al.

(10) Patent No.: US 9,378,895 B2
(45) Date of Patent: Jun. 28, 2016

(54) METHOD OF MANUFACTURING A WINDING-TYPE SOLID ELECTROLYTIC CAPACITOR PACKAGE STRUCTURE USING A LEAD FRAME

(71) Applicant: APAQ TECHNOLOGY CO., LTD., Miaoli County (TW)

(72) Inventors: Ming-Tsung Chen, Changhua County (TW); Ching-Feng Lin, Hsinchu County (TW)

(73) Assignee: Apaq Technology Co., Ltd., Miaoli County (TW)

( * ) Notice: Subject to any disclaimer, the term of this patent is extended or adjusted under 35 U.S.C. 154(b) by 0 days.

(21) Appl. No.: 14/834,896

(22) Filed: Aug. 25, 2015

(65) Prior Publication Data

US 2015/0364262 A1    Dec. 17, 2015

Related U.S. Application Data

(62) Division of application No. 13/845,168, filed on Mar. 18, 2013, now Pat. No. 9,147,528.

(51) Int. Cl.
| | |
|---|---|
| *H01G 9/00* | (2006.01) |
| *H01G 9/15* | (2006.01) |
| *H01G 4/232* | (2006.01) |
| *H01G 9/012* | (2006.01) |
| *H01G 9/10* | (2006.01) |
| *H01G 9/008* | (2006.01) |

(52) U.S. Cl.
CPC ............. *H01G 9/0029* (2013.01); *H01G 4/232* (2013.01); *H01G 9/012* (2013.01); *H01G 9/10* (2013.01); *H01G 9/151* (2013.01); *H01G 9/008* (2013.01); *Y10T 29/417* (2015.01); *Y10T 29/42* (2015.01)

(58) Field of Classification Search
CPC ........... H01G 9/008; H01G 9/06; H01G 9/08; H01G 9/0029; H01G 9/012; H01G 9/151; H01G 4/232; H01G 11/86; H01G 9/004; H01G 9/04; H01G 13/02
See application file for complete search history.

(56) References Cited

U.S. PATENT DOCUMENTS

| | | | | |
|---|---|---|---|---|
| 4,805,074 | A * | 2/1989 | Harakawa | H01G 9/0029 29/25.03 |
| 4,876,451 | A * | 10/1989 | Ikeda | H01G 9/02 29/25.03 |
| 2009/0246626 | A1 * | 10/2009 | Tasaki | H01G 11/86 429/208 |
| 2009/0323254 | A1 * | 12/2009 | Yamane | H01G 9/008 361/520 |
| 2014/0262459 | A1 * | 9/2014 | Chen | H01G 9/0029 174/257 |

* cited by examiner

*Primary Examiner* — Dion R Ferguson
(74) *Attorney, Agent, or Firm* — Rosenberg, Klein & Lee

(57) ABSTRACT

A winding-type solid electrolytic capacitor package structure includes a winding capacitor unit, a package body and a conductive unit. The winding capacitor has a winding body enclosed by the package body, a positive conductive lead pin having a cutting surface, and a negative conductive lead pin having a grinding surface. The conductive unit includes a positive conductive terminal electrically connected to the positive conductive lead pin and a negative conductive terminal electrically connected to the negative conductive lead pin. The positive conductive terminal has a first embedded portion enclosed by the package body and a first exposed portion exposed outside the package body. The negative conductive terminal has a second embedded portion enclosed by the package body and a second exposed portion exposed outside the package body. The first and the second exposed portions are extended along the outer surface of the package body.

8 Claims, 8 Drawing Sheets

METHOD OF MANUFACTURING A WINDING-TYPE SOLID ELECTROLYTIC CAPACITOR PACKAGE STRUCTURE USING A LEAD FRAME

CROSS REFERENCE TO RELATED APPLICATIONS

This application is a divisional application of Ser. No. 13/845,168 filed on Mar. 18, 2013, and entitled "WINDING-TYPE SOLID ELECTROLYTIC CAPACITOR PACKAGE STRUCTURE USING A LEAD FRAME AND METHOD OF MANUFACTURING THE SAME", now pending, the entire disclosures of which are incorporated herein by reference.

BACKGROUND OF THE INVENTION

1. Field of the Invention

The instant disclosure relates to a method of manufacturing a solid electrolytic capacitor package structure, and more particularly to a method of manufacturing a winding-type solid electrolytic capacitor package structure using a lead frame.

2. Description of Related Art

The winding-type capacitor includes a capacitor core, a casing, and a sealing cover. The capacitor core has an anode foil coupled to an anode terminal, a cathode foil coupled to a cathode terminal, a separator, and an electrolyte layer. The anode foil, the cathode foil and the separator are rolled together. The separator is disposed between the anode foil and the cathode foil. The electrolyte layer is formed between the anode foil and the cathode foil. The casing has an opening for receiving the capacitor core. The sealing cover can used to seal the casing, and the anode terminal and the cathode terminal can pass through a through hole of the sealing cover. A given space is provided between the sealing cover and the capacitor core. A stopper for securing the space is provided on at least one of the anode terminal and the cathode terminal. However, there is no any other package body for enclosing the winding-type capacitor in the prior art.

SUMMARY OF THE INVENTION

One aspect of the instant disclosure relates to a method of manufacturing a winding-type solid electrolytic capacitor package structure using a lead frame.

One of the embodiments of the instant disclosure provides a method of manufacturing a winding-type solid electrolytic capacitor package structure using a lead frame, comprising: providing a plurality of winding capacitors, wherein each winding capacitor has a winding body, a positive conductive lead pin extended from a first lateral side of the winding body, a negative conductive lead pin extended from a second lateral side of the winding body, a positive soldering foot soldered on an end of the positive conductive lead pin, and a negative soldering foot soldered on an end of the negative conductive lead pin; pressing the winding body of each winding capacitor from a cylinder into a cuboid; removing the negative soldering foot of each winding capacitor by cutting; soldering the positive soldering foot of each winding capacitor on a connection bar; processing the winding capacitors by a carbonization process, a formation process and a polymer-impregnated process in sequence; removing polymer that has been formed on an end portion of the negative conductive lead pin of each winding capacitor; removing the positive soldering foot of each winding capacitor by cutting; respectively placing the winding capacitors on a plurality of conductive units, wherein each conductive unit includes a positive conductive terminal electrically connected to the positive conductive lead pin of the corresponding winding capacitor and a negative conductive terminal electrically connected to the negative conductive lead pin of the corresponding winding capacitor; forming a plurality of package bodies to respectively enclose the winding capacitors, wherein the positive conductive terminal of each conductive unit has a first embedded portion electrically connected to the positive conductive lead pin of the corresponding winding capacitor and enclosed by the corresponding package body and a first exposed portion connected with the first embedded portion and exposed outside the corresponding package body, and the negative conductive terminal of each conductive unit has a second embedded portion electrically connected to the negative conductive lead pin of the corresponding winding capacitor and enclosed by the corresponding package body and a second exposed portion connected with the second embedded portion and exposed outside the corresponding package body; and then bent the first exposed portion and the second exposed portion of each conductive unit along an outer surface of the corresponding package body.

More precisely, the positive conductive lead pin has a first flattening surface and a second flattening surface respectively formed on the top side and the bottom side thereof, the negative conductive lead pin has a first flattening surface and a second flattening surface respectively formed on the top side and the bottom side thereof, and the second flattening surface of the positive conductive lead pin and the second flattening surface of the negative conductive lead pin are respectively abutted against the first embedded portion and the second embedded portion, wherein the positive conductive lead pin has a cutting surface formed on an end thereof, and the negative conductive lead pin has a grinding surface formed on the end portion thereof by grinding or sandblasting.

More precisely, the winding body has a positive foil sheet, a negative foil sheet and an isolation paper disposed between the positive foil sheet and the negative foil sheet, the positive foil sheet, the negative foil sheet and the isolation paper are rolled to form a cuboid capacitor core, and the positive conductive lead pin and the negative conductive lead pin respectively electrically contact the positive foil sheet and the negative foil sheet.

More precisely, the positive conductive lead pin has a first positive conductive portion inserted into the winding body and electrically contacting the positive foil sheet and a second positive conductive portion connected to the first positive conductive portion and extended and exposed from the winding body, and the negative conductive lead pin has a first negative conductive portion inserted into the winding body and electrically contacting the negative foil sheet and a second negative conductive portion connected to the first negative conductive portion and extended and exposed from the winding body.

More precisely, both the length of the first positive conductive portion that has been inserted into the winding body and the length of the first negative conductive portion that has been inserted into the winding body are the same as the width of the winding body.

More precisely, the method further comprises: heating the winding body of each winding capacitor at a temperature about 50° C.~300° C. in the step of pressing the winding body of each winding capacitor.

More precisely, the winding capacitors are respectively disposed on the conductive units by soldering or through solder paste or conductive glue.

More precisely, the method further comprises: fixing the winding body of each winding capacitor through a clamping apparatus before the step of removing the polymer that has been formed on the end portion of the negative conductive lead pin of each winding capacitor.

Therefore, because the polymer that has been formed on the end portion of the negative conductive lead pin of each winding capacitor can be removed by grinding, scraping or sandblasting etc., the negative conductive lead pin has a grinding surface (or scraping or sandblasting surface) formed on the end portion of the negative conductive lead pin by grinding, scraping or sandblasting etc. for increasing the soldering yield rate and the equivalent series resistance (ESR).

To further understand the techniques, means and effects of the instant disclosure applied for achieving the prescribed objectives, the following detailed descriptions and appended drawings are hereby referred, such that, through which, the purposes, features and aspects of the instant disclosure can be thoroughly and concretely appreciated. However, the appended drawings are provided solely for reference and illustration, without any intention to limit the instant disclosure.

DETAILED DESCRIPTION OF THE PREFERRED EMBODIMENTS

Figure 1:
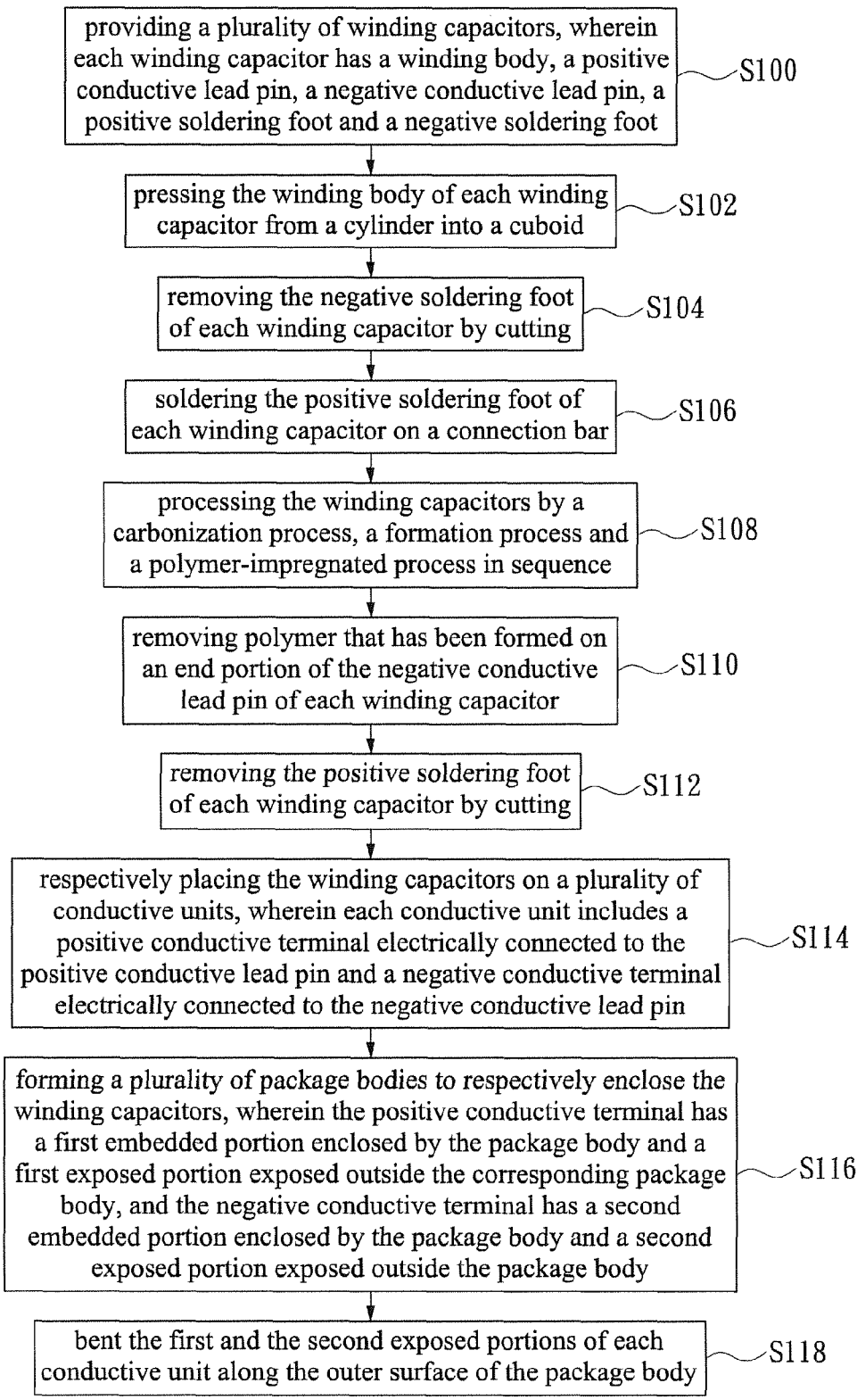
FIG. 1 shows a flowchart of the method of manufacturing a winding-type solid electrolytic capacitor package structure using a lead frame according to the instant disclosure.
Figure 2:
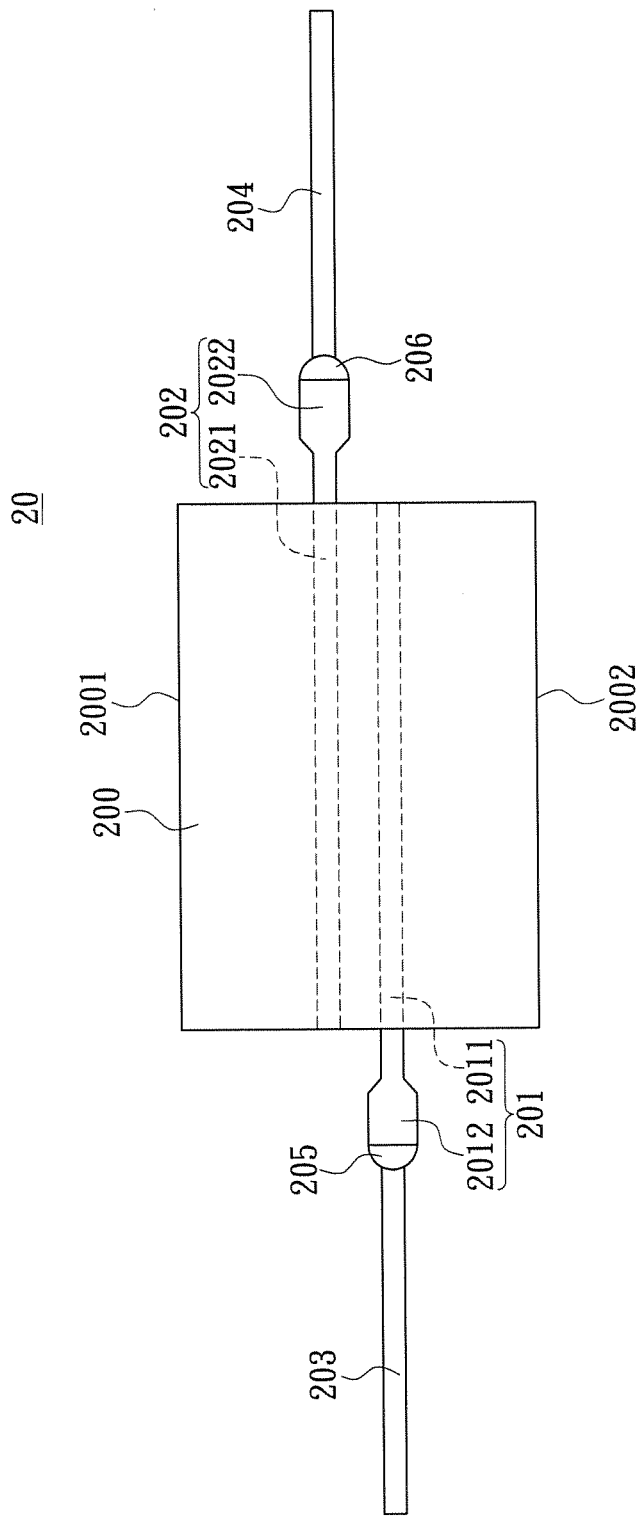
FIG. 2 shows a lateral, schematic view of the winding capacitor according to the instant disclosure.
Figure 3:
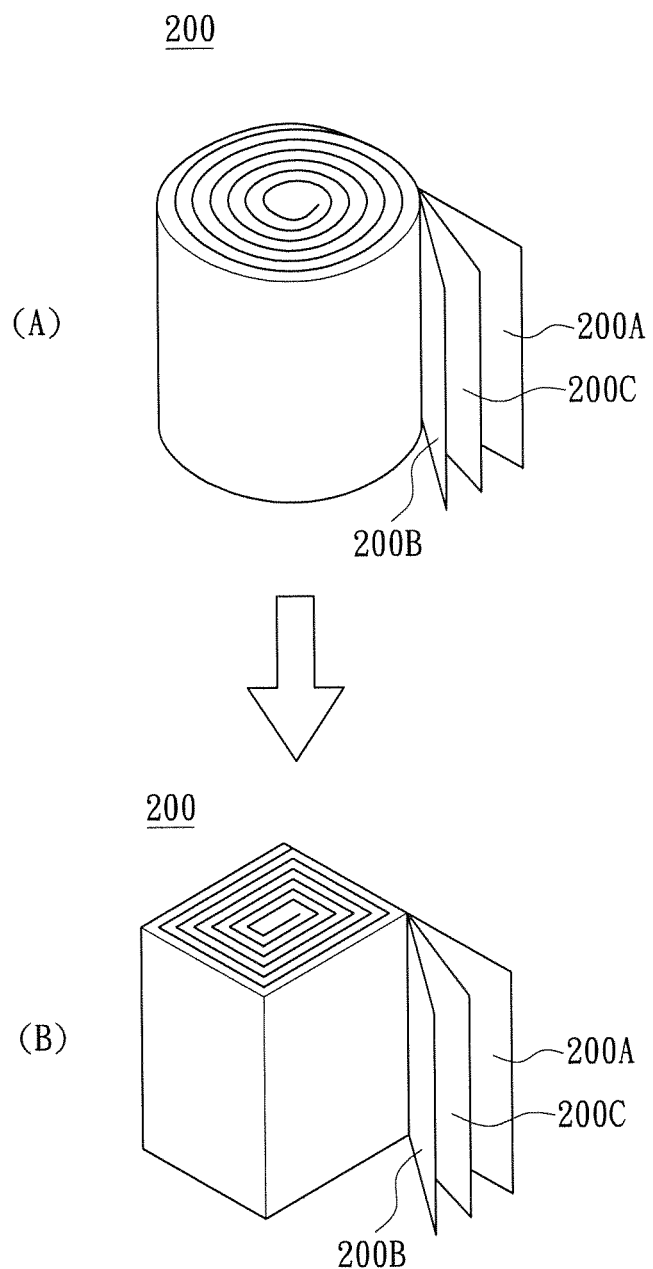
FIG. 3 shows a perspective, schematic view of pressing the winding body of the winding capacitor from a cylinder into a cuboid according to the instant disclosure.
Figure 4:
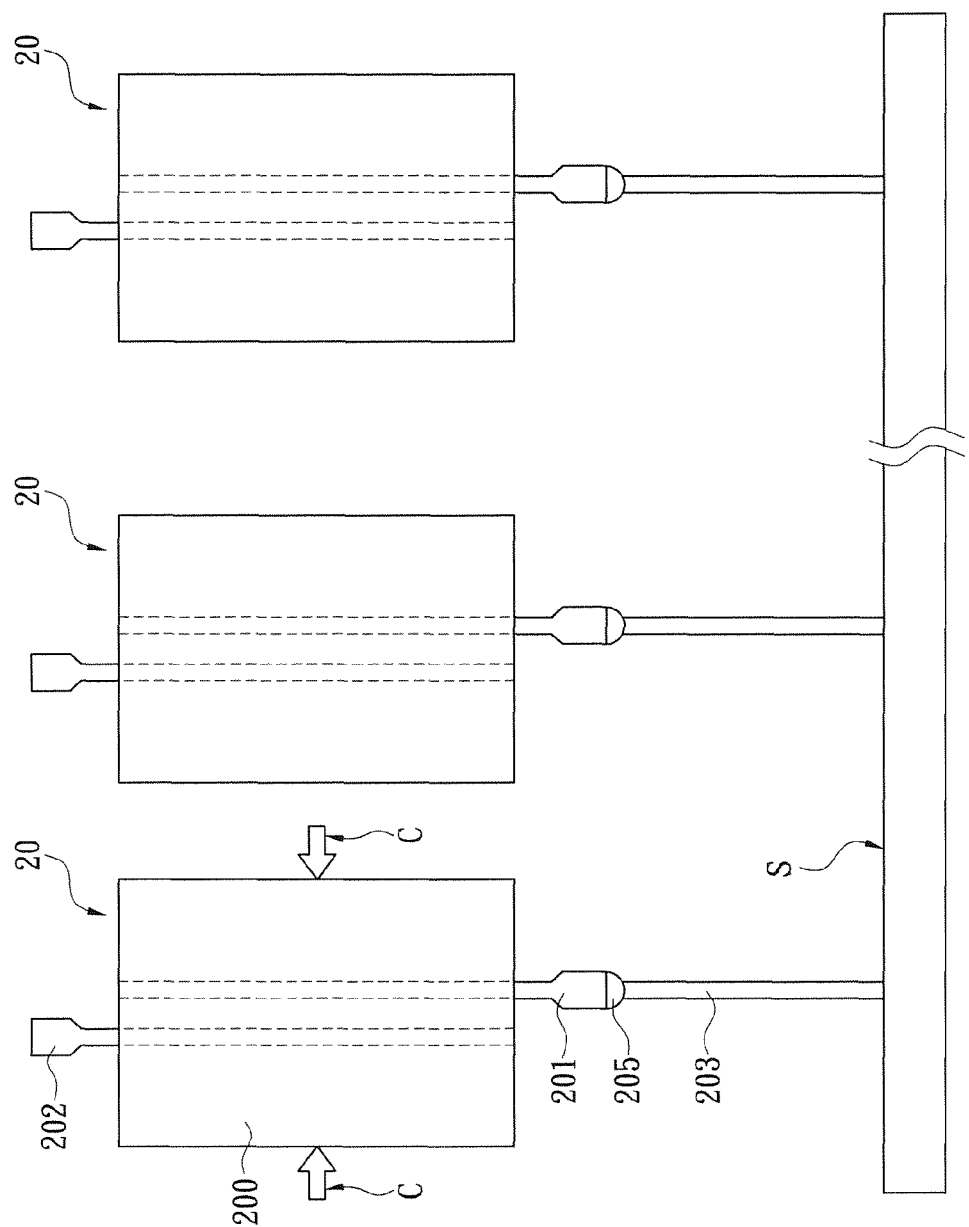
FIG. 4 shows a lateral, schematic view of soldering the positive soldering foot of each winding capacitor on the connection bar according to the instant disclosure.
Figure 5:
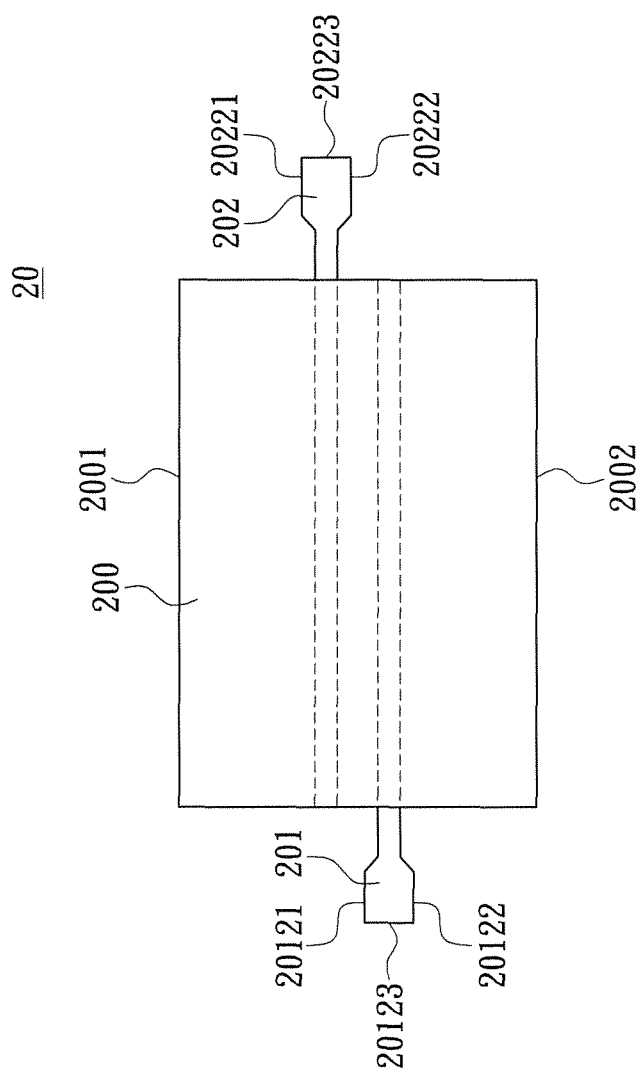
FIG. 5 shows a lateral, schematic view of removing the positive soldering foot and the negative soldering foot of the winding capacitor according to the instant disclosure.
Figure 6:
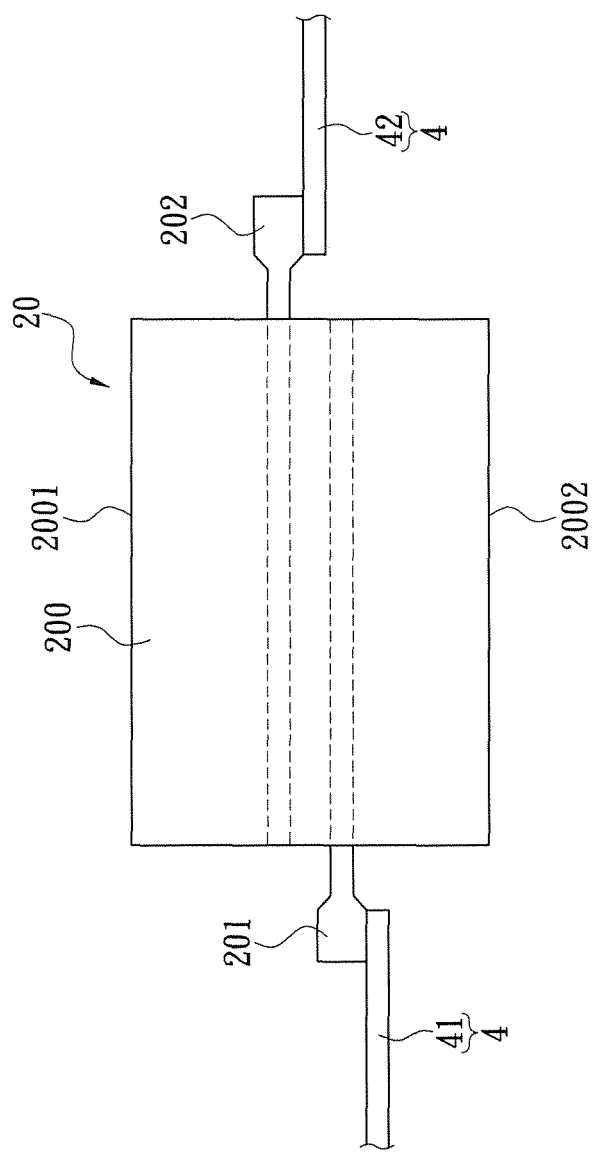
FIG. 6 shows a lateral, schematic view of placing the winding capacitor on the conductive unit according to the instant disclosure.
Figure 7:
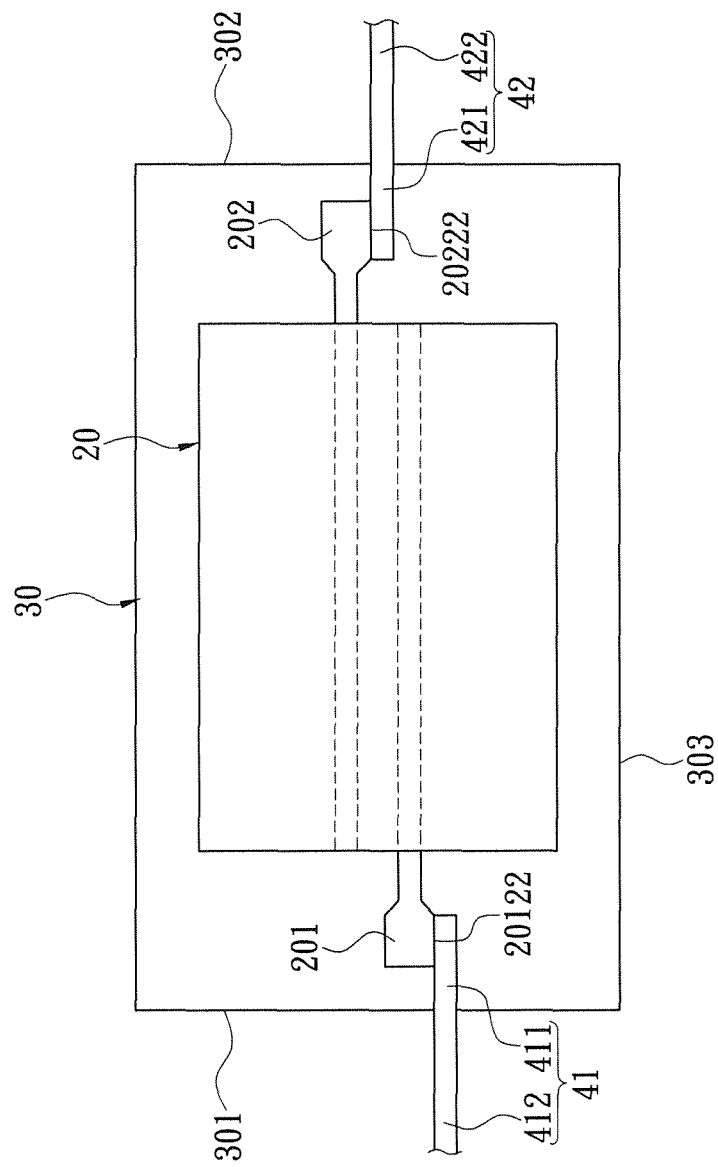
FIG. 7 shows a lateral, schematic view of enclosing the winding capacitor by the package body according to the instant disclosure.
Figure 8:
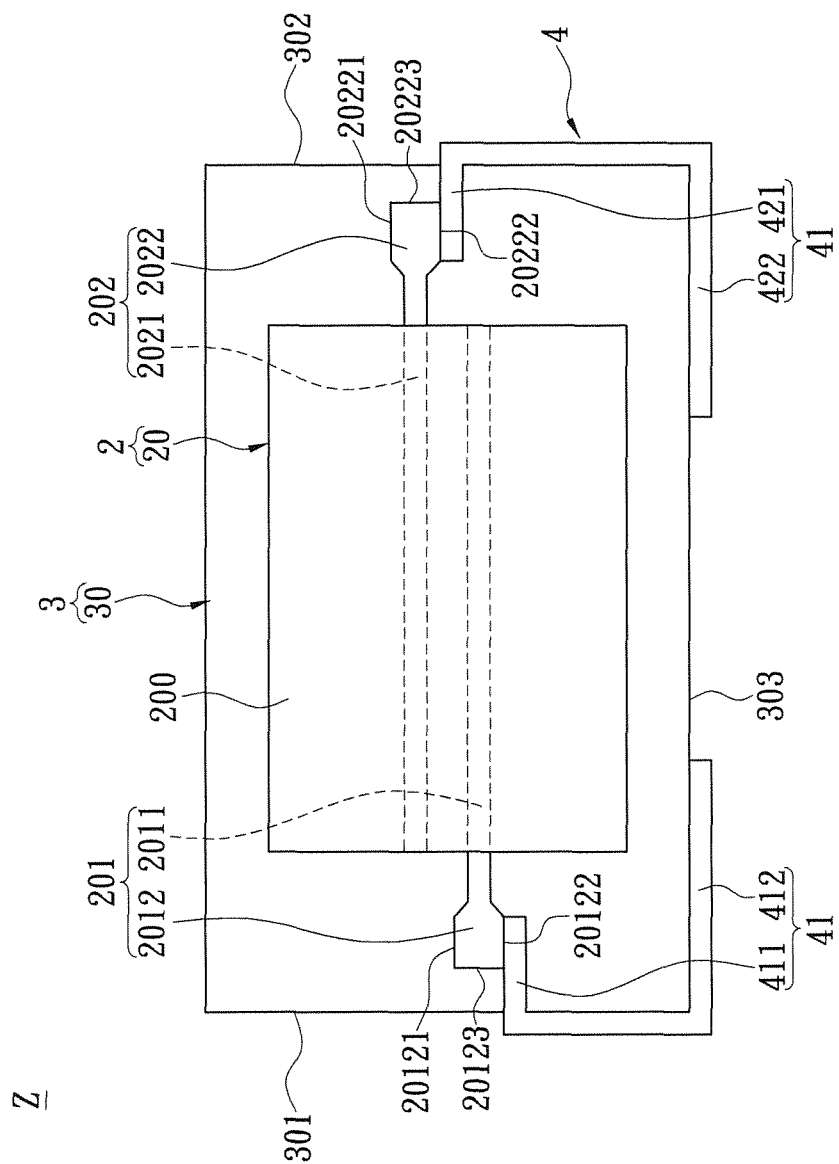
FIG. 8 shows a lateral, schematic view of the winding-type solid electrolytic capacitor package structure using a lead frame according to the instant disclosure.

Referring to FIG. 1 to FIG. 8, where FIG. 1 shows a flowchart of the method of manufacturing a winding-type solid electrolytic capacitor package structure using a lead frame according to the instant disclosure, FIG. 2 shows a lateral, schematic view of the winding capacitor according to the instant disclosure, FIG. 3 shows a perspective, schematic view of pressing the winding body of the winding capacitor from a cylinder into a cuboid according to the instant disclosure, FIG. 4 shows a lateral, schematic view of soldering the positive soldering foot of each winding capacitor on the connection bar according to the instant disclosure, FIG. 5 shows a lateral, schematic view of removing the positive soldering foot and the negative soldering foot of the winding capacitor according to the instant disclosure, FIG. 6 shows a lateral, schematic view of placing the winding capacitor on the conductive unit according to the instant disclosure, FIG. 7 shows a lateral, schematic view of enclosing the winding capacitor by the package body according to the instant disclosure, and FIG. 8 shows a lateral, schematic view of the winding-type solid electrolytic capacitor package structure using a lead frame according to the instant disclosure. The instant disclosure provides a method of manufacturing a winding-type solid electrolytic capacitor package structure Z using a lead frame, comprising the following steps:

First, referring to FIG. 1 and FIG. 2, the step S100 is that: providing a plurality of winding capacitors 20, wherein each winding capacitor 20 has a winding body 200, a positive conductive lead pin 201 extended from a first lateral side of the winding body 200, a negative conductive lead pin 202 extended from a second lateral side of the winding body 200, a positive soldering foot 203 soldered on an end of the positive conductive lead pin 201, and a negative soldering foot 204 soldered on an end of the negative conductive lead pin 202. More precisely, the positive conductive lead pin 201 and the negative conductive lead pin 202 are respectively extended from two opposite lateral sides of the winding body 200. In addition, the positive soldering foot 203 can be soldered on the end of the positive conductive lead pin 201 through a first soldering point 205, and the negative soldering foot 204 can be soldered on the end of the negative conductive lead pin 202 through a second soldering point 206.

For example, both the positive conductive lead pin 201 and the negative conductive lead pin 202 can be made of a pure Al (aluminum) material or an Al alloy material, the positive soldering foot 203 may be a first multilayer structure composed of a plurality of first material layers (not shown), and the negative soldering foot 204 may be a second multilayer structure composed of a plurality of second material layers (not shown). In addition, the innermost first material layer and the inner most second material layer are two Fe (ferrum) layers or two Cu (copper) layers, and the outermost first material layer and the outermost second material layer are two Sn (Stannum) layers respectively surrounding the two Fe layers or the two Cu layers. However, the above-mentioned design for the winding capacitors 20 is merely an example and is not meant to limit the instant disclosure.

Next, referring to FIG. 1, FIG. 2 and FIG. 3, the step S102 is that: pressing the winding body 200 of each winding capacitor 20 from a cylinder into a cuboid such as a rectangular prism. In other words, the shape of the winding body 200 can be changed from the cylinder into the cuboid by pressing. Hence, the winding body 200 of each winding capacitor 20 has a plane top surface 2001 and a plane bottom surface 2002 formed by pressing, and the plane top surface 2001 and the plane bottom surface 2002 are opposite to each other. More precisely, the method of the instant disclosure further comprises: heating the winding body 200 of each winding capacitor 20 at a temperature about 50° C.~300° C. in or before the step of pressing the winding body 200 of each winding capacitor 20.

For example, referring to FIG. 2 and FIG. 3, the winding body 200 has a positive foil sheet 200A, a negative foil sheet 200B and an isolation paper 200C disposed between the positive foil sheet 200A and the negative foil sheet 200C, and the positive foil sheet 200A, the negative foil sheet 200B and the isolation paper 200C can be rolled and pressed to form a cuboid capacitor core. In addition, the positive conductive lead pin 201 and the negative conductive lead pin 202 can respectively electrically contact the positive foil sheet 200A and the negative foil sheet 200B. Moreover, the positive conductive lead pin 201 has a first positive conductive portion 2011 inserted into the winding body 200 and electrically contacting the positive foil sheet 200A and a second positive conductive portion 2012 integrally connected to the first positive conductive portion 2011 and extended and exposed from the winding body 200. And, the negative conductive lead pin 202 has a first negative conductive portion 2021 inserted into the winding body 200 and electrically contacting the negative foil sheet 200B and a second negative conductive portion 2022 integrally connected to the first negative conductive portion 2021 and extended and exposed from the winding body 200. In addition, both the length (shown as the dotted line in FIG. 2) of the first positive conductive portion 2011 that has been inserted into the winding body 200 and the length (shown as the dotted line in FIG. 2) of the first negative conductive portion 2021 that has been inserted into the winding body 200 are substantially the same as the width of the winding body 200. More precisely, the method of manufacturing the cuboid capacitor core further includes: rolling the positive foil sheet 200A, the negative foil sheet 200B and the isolation paper 200C to form a cylinder capacitor core (shown as the step (A) of FIG. 3), and then pressing the cylinder capacitor core to form a cuboid capacitor core (shown as the step (B) of FIG. 3) at a temperature about 50° C.~300° C.

Then, referring to FIG. 1, FIG. 2 and FIG. 4, the method of the instant disclosure further comprises: removing the negative soldering foot 204 of each winding capacitor 20 by cutting (the step S104) and removing the second soldering point 206 (as shown in FIG. 4, the negative conductive lead pin 202 is still remained on the winding body 200), soldering the positive soldering foot 203 of each winding capacitor 20 on a connection bar S (the step S106), and then processing the winding capacitors 20 by a carbonization process, a formation process and a polymer-impregnated process in sequence (the step S108). In addition, both the carbonization process and the formation process can be repeatedly proceeded for increasing the production yield rate.

Afterward, referring to FIG. 1, FIG. 4 and FIG. 5, the method of the instant disclosure further comprises: removing polymer that has been formed on an end portion of the negative conductive lead pin 202 of each winding capacitor 20 (the step S110), and then removing the positive soldering foot 203 of each winding capacitor 20 by cutting (the step S112) and removing the first soldering point 205 (as shown in FIG. 5, the positive conductive lead pin 201 is still remained on the winding body 200). More precisely, the method of the instant disclosure further comprises: fixing the winding body 200 of each winding capacitor 20 through a clamping apparatus C (shown as the arrow in FIG. 4) before the step of removing the polymer that has been formed on the end portion of the negative conductive lead pin 202 of each winding capacitor 20. Hence, the clamping apparatus C can be used to prevent the winding capacitors 20 from being shaken or swayed, thus it is convenient to remove the polymer by using the clamping apparatus C. Furthermore, the positive conductive lead pin 201 has a first flattening surface 20121 and a second flattening surface 20122 respectively formed on the top side and the bottom side thereof, and the negative conductive lead pin 202 has a first flattening surface 20221 and a second flattening surface 20222 respectively formed on the top side and the bottom side thereof. In addition, because the positive soldering foot 203 and the first soldering point 205 of each winding capacitor 20 can be removed by cutting, the positive conductive lead pin 201 has a cutting surface 20123 formed on an end of the positive conductive lead pin 201. And, because the polymer that has been formed on the end portion of the negative conductive lead pin 202 of each winding capacitor 20 can be removed by grinding, scraping or sandblasting etc., the negative conductive lead pin 202 has a grinding surface 20223 (or scraping or sandblasting surface) formed on the end portion of the negative conductive lead pin 202 by grinding, scraping or sandblasting etc. for increasing the soldering yield rate and the equivalent series resistance (ESR).

Subsequently, referring to FIG. 1, FIG. 5 and FIG. 6, the step S114 is that: respectively placing the winding capacitors 20 on a plurality of conductive units 4 such as the lead frames, wherein each conductive unit 4 includes a positive conductive terminal 41 (such as the positive electrode of the lead frame) electrically connected to the positive conductive lead pin 201 of the corresponding winding capacitor 20 and a negative conductive terminal 42 (such as the negative electrode of the lead frame) electrically connected to the negative conductive lead pin 202 of the corresponding winding capacitor 20. More precisely, the winding capacitors 20 can be respectively disposed on the conductive units 4 by soldering or through solder paste or conductive glue etc.

Next, referring to FIG. 1, FIG. 6 and FIG. 7, the step S116 is that: forming a plurality of package bodies 30 to respectively enclose the winding capacitors 20, wherein the positive conductive terminal 41 of each conductive unit 4 has a first embedded portion 411 electrically connected to the positive conductive lead pin 201 of the corresponding winding capacitor 20 and enclosed by the corresponding package body 30 and a first exposed portion 412 connected with the first embedded portion 411 and exposed outside or from the corresponding package body 30, and the negative conductive terminal 42 of each conductive unit 4 has a second embedded portion 421 electrically connected to the negative conductive lead pin 202 of the corresponding winding capacitor 20 and enclosed by the corresponding package body 30 and a second exposed portion 422 connected with the second embedded portion 421 and exposed outside or from the corresponding package body 30. More precisely, the winding capacitors can be processed by an ageing process after the step S116 of forming the package bodies 30 to respectively enclose the winding capacitors 20. Furthermore, each package body 30 has a first lateral surface 301, a second lateral surface 302 opposite to the first lateral surface 301, and a bottom surface 303 connected between the first lateral surface 301 and the second lateral surface 302. When the winding capacitors 20 are respectively disposed on the conductive units 4, the second flattening surface 20122 of the positive conductive lead pin 201 and the second flattening surface 20222 of the negative conductive lead pin 202 can be respectively abutted against the first embedded portion 411 and the second embedded portion 412.

Finally, referring to FIG. 1, FIG. 7 and FIG. 8, the step S118 is that: bent the first exposed portion 412 and the second exposed portion 422 of each conductive unit 4 along an outer surface of the corresponding package body 30. More precisely, the first exposed portion 412 can be extended along the first lateral surface 301 and the bottom surface 303 of the package body 30, and the second exposed portion 422 can be extended along the second lateral surface 302 and the bottom surface 303 of the package body 30.

In conclusion, the instant disclosure provides a method of manufacturing a winding-type solid electrolytic capacitor package structure using a lead frame, comprising: providing a plurality of winding capacitors, wherein each winding capacitor has a winding body, a positive conductive lead pin, a negative conductive lead pin, a positive soldering foot and a negative soldering foot; pressing the winding body of each winding capacitor from a cylinder into a cuboid; removing the negative soldering foot of each winding capacitor by cutting; soldering the positive soldering foot of each winding capacitor on a connection bar; processing the winding capacitors by a carbonization process, a formation process and a polymer-impregnated process in sequence; removing polymer that has been formed on an end portion of the negative conductive lead pin of each winding capacitor; removing the positive soldering foot of each winding capacitor by cutting; respectively placing the winding capacitors on a plurality of conductive units, wherein each conductive unit includes a positive conductive terminal and a negative conductive terminal; forming a plurality of package bodies to respectively enclose the winding capacitors, wherein the positive conductive terminal of each conductive unit has a first embedded portion and a first exposed portion, and the negative conductive terminal of each conductive unit has a second embedded portion and a second exposed portion; and then bent the first exposed portion and the second exposed portion of each conductive unit along an outer surface of the corresponding package body.

Hence, the instant disclosure can provide a winding-type solid electrolytic capacitor package structure Z using a lead frame through the step S100 to the step S118, comprising: a capacitor unit 2, a package unit 3 and a conductive unit 4.

First, the capacitor unit 2 includes at least one winding capacitor 20, and the at least one winding capacitor 20 has a winding body 200, a positive conductive lead pin 201 extended from a first lateral side of the winding body 200, and a negative conductive lead pin 202 extended from a second lateral side of the winding body 200. In addition, the positive conductive lead pin 201 has a cutting surface 20123 formed on an end thereof by cutting process, and the negative conductive lead pin 202 has a grinding surface 20223 formed on an end thereof by grinding process.

More precisely, the positive conductive lead pin 201 has a first positive conductive portion 2011 inserted into the winding body 200 and electrically contacting the positive foil sheet 200A and a second positive conductive portion 2012 integrally connected to the first positive conductive portion 2011 and extended and exposed from the winding body 200. In addition, the negative conductive lead pin 202 has a first negative conductive portion 2021 inserted into the winding body 200 and electrically contacting the negative foil sheet 200B and a second negative conductive portion 2022 integrally connected to the first negative conductive portion 2021 and extended and exposed from the winding body 200. For example, both the length of the first positive conductive portion 2011 that has been inserted into the winding body 200 and the length of the first negative conductive portion 2021 that has been inserted into the winding body 200 are substantially the same as the width of the winding body 200.

Moreover, the package unit 3 includes a package body 30 for enclosing the at least one winding capacitor 20, and the package body 30 has a first lateral surface 301, a second lateral surface 302 opposite to the first lateral surface 301, and a bottom surface 303 connected between the first lateral surface 301 and the second lateral surface 302. In addition, the conductive unit 4 includes a positive conductive terminal 41 electrically connected to the positive conductive lead pin 201 and a negative conductive terminal 42 electrically connected to the negative conductive lead pin 202, and the positive conductive terminal 41 and the negative conductive terminal 42 are separated from each other.

More precisely, the positive conductive terminal 41 has a first embedded portion 411 electrically connected to the positive conductive lead pin 201 and enclosed by the package body 30 and a first exposed portion 412 connected with the first embedded portion 411 and exposed outside the package body 30, and the first exposed portion 412 can be extended along the first lateral surface 301 and the bottom surface 303 of the package body 30. In addition, the negative conductive terminal 42 has a second embedded portion 421 electrically connected to the negative conductive lead pin 202 and enclosed by the package body 30 and a second exposed portion 422 connected with the second embedded portion 421 and exposed outside the package body 30, and the second exposed portion 422 can be extended along the second lateral surface 302 and the bottom surface 303 of the package body 30. For example, the positive conductive lead pin 201 has a first flattening surface 20121 and a second flattening surface 20122 respectively formed on the top side and the bottom side thereof, the negative conductive lead pin 202 has a first flattening surface 20221 and a second flattening surface 20222 respectively formed on the top side and the bottom side thereof, and the second flattening surface 20122 of the positive conductive lead pin 201 and the second flattening surface 20222 of the negative conductive lead pin 202 can be respectively abutted against the first embedded portion 411 and the second embedded portion 421.

In conclusion, because the polymer that has been formed on the end portion of the negative conductive lead pin 202 of each winding capacitor 20 can be removed by grinding, scraping or sandblasting etc., the negative conductive lead pin 202 has a grinding surface 20223 (or scraping or sandblasting surface) formed on the end portion of the negative conductive lead pin 202 by grinding, scraping or sandblasting etc. for increasing the soldering yield rate and the equivalent series resistance (ESR).

The above-mentioned descriptions merely represent the preferred embodiments of the instant disclosure, without any intention or ability to limit the scope of the instant disclosure which is fully described only within the following claims. Various equivalent changes, alterations or modifications based on the claims of instant disclosure are all, consequently, viewed as being embraced by the scope of the instant disclosure.

What is claimed is:

1. A method of manufacturing a winding-type solid electrolytic capacitor package structure using a lead frame, comprising: providing a plurality of winding capacitors, wherein each winding capacitor has a winding body, a positive conductive lead pin extended from a first lateral side of the winding body, a negative conductive lead pin extended from a second lateral side of the winding body, a positive soldering foot soldered on an end of the positive conductive lead pin, and a negative soldering foot soldered on an end of the negative conductive lead pin;
   pressing the winding body of each winding capacitor from a cylinder into a cuboid;
   removing the negative soldering foot of each winding capacitor by cutting;
   soldering the positive soldering foot of each winding capacitor on a connection bar;
   processing the winding capacitors by a carbonization process, a formation process and a polymer-impregnated process in sequence;
   removing polymer that has been formed on an end portion of the negative conductive lead pin of each winding capacitor;
   removing the positive soldering foot of each winding capacitor by cutting;
   respectively placing the winding capacitors on a plurality of conductive units, wherein each conductive unit includes a positive conductive terminal electrically connected to the positive conductive lead pin of the corresponding winding capacitor and a negative conductive terminal electrically connected to the negative conductive lead pin of the corresponding winding capacitor;

forming a plurality of package bodies to respectively enclose the winding capacitors, wherein the positive conductive terminal of each conductive unit has a first embedded portion electrically contacting the positive conductive lead pin of the corresponding winding capacitor and enclosed by the corresponding package body and a first exposed portion connected with the first embedded portion and exposed outside the corresponding package body, and the negative conductive terminal of each conductive unit has a second embedded portion electrically contacting the negative conductive lead pin of the corresponding winding capacitor and enclosed by the corresponding package body and a second exposed portion connected with the second embedded portion and exposed outside the corresponding package body; and bending the first exposed portion and the second exposed portion of each conductive unit along an outer surface of the corresponding package body.

2. The method of claim 1, wherein the positive conductive lead pin has a first flattening surface and a second flattening surface respectively formed on the top side and the bottom side thereof, the negative conductive lead pin has a first flattening surface and a second flattening surface respectively formed on the top side and the bottom side thereof, and the second flattening surface of the positive conductive lead pin and the second flattening surface of the negative conductive lead pin are respectively abutted against the first embedded portion and the second embedded portion, wherein the positive conductive lead pin has a cutting surface formed on an end thereof, and the negative conductive lead pin has a grinding surface formed on the end portion thereof by grinding or sandblasting.

3. The method of claim 1, wherein the winding body has a positive foil sheet, a negative foil sheet and an isolation paper disposed between the positive foil sheet and the negative foil sheet, the positive foil sheet, the negative foil sheet and the isolation paper are rolled to form a cuboid capacitor core, and the positive conductive lead pin and the negative conductive lead pin respectively electrically contact the positive foil sheet and the negative foil sheet.

4. The method of claim 3, wherein the positive conductive lead pin has a first positive conductive portion inserted into the winding body and electrically contacting the positive foil sheet and a second positive conductive portion connected to the first positive conductive portion and extended and exposed from the winding body, and the negative conductive lead pin has a first negative conductive portion inserted into the winding body and electrically contacting the negative foil sheet and a second negative conductive portion connected to the first negative conductive portion and extended and exposed from the winding body.

5. The method of claim 4, wherein both the length of the first positive conductive portion that has been inserted into the winding body and the length of the first negative conductive portion that has been inserted into the winding body are the same as the width of the winding body.

6. The method of claim 1, further comprising: heating the winding body of each winding capacitor at a temperature about 50° C.~300° C. in the step of pressing the winding body of each winding capacitor.

7. The method of claim 1, wherein the winding capacitors are respectively disposed on the conductive units by soldering or through solder paste or conductive glue.

8. The method of claim 1, further comprising: fixing the winding body of each winding capacitor through a clamping apparatus before the step of removing the polymer that has been formed on the end portion of the negative conductive lead pin of each winding capacitor.

* * * * *